United States Patent
Balzamo, Jr.

(10) Patent No.: US 11,354,443 B2
(45) Date of Patent: Jun. 7, 2022

(54) SYSTEM AND METHOD FOR PROVIDING CUSTOMIZABLE PROPERTY MANAGEMENT SERVICES ENABLING INCREASED TRANSPARENCY AND COMMUNICATION

(71) Applicant: Joseph Balzamo, Jr., Morristown, NJ (US)

(72) Inventor: Joseph Balzamo, Jr., Morristown, NJ (US)

(73) Assignee: NEIGHBORHOOD CONNECTIONS LLC, Morristown, NJ (US)

( * ) Notice: Subject to any disclaimer, the term of this patent is extended or adjusted under 35 U.S.C. 154(b) by 28 days.

(21) Appl. No.: 16/142,951

(22) Filed: Sep. 26, 2018

(65) Prior Publication Data

US 2019/0096013 A1    Mar. 28, 2019

Related U.S. Application Data

(60) Provisional application No. 62/563,436, filed on Sep. 26, 2017.

(51) Int. Cl.
  *G06F 21/62*     (2013.01)
  *G06Q 50/16*    (2012.01)
  (Continued)

(52) U.S. Cl.
  CPC ............ *G06F 21/629* (2013.01); *G06F 21/62* (2013.01); *G06Q 50/163* (2013.01); *H04L 63/08* (2013.01); *H04L 63/105* (2013.01); *G06F 3/0482* (2013.01)

(58) Field of Classification Search
  CPC . G06F 3/0481–0483; G06F 21/62–629; G06F 2221/2113; G06F 2221/2141;
  (Continued)

(56) References Cited

U.S. PATENT DOCUMENTS 9,536,231 B2    1/2017 Lerick et al.
2011/0289009 A1    11/2011 Rankin, Jr. et al.
(Continued)

FOREIGN PATENT DOCUMENTS

CN    201345053 Y    1/2009
CN    106651680 A    5/2017
(Continued)

OTHER PUBLICATIONS

Halvitigala et al. "The Use of Property Management Software in Residential Property Management". 20th Annual Pacific-Rim Real Estate Society Conference Christchurch, New Zealand, Jan. 19-22, 2014. (Year: 2014).*

*Primary Examiner* — Kevin Bechtel
(74) *Attorney, Agent, or Firm* — Gearhart Law LLC

(57) ABSTRACT

Systems and methods are provided for providing property management services. The method includes receiving, using a graphical user interface coupled to an electronic device, login credentials for a user for access to a digital application for providing property management services, wherein the electronic device is coupled to one or more secondary electronic devices through one or more servers. The method further includes authenticating, using a processor coupled to the electronic device, an identity of the user, wherein the authenticating includes determining a user type for the user. The method additionally includes granting access to the user to a digital menu configured for the user type for the user, and displaying the digital menu to the user, using the graphical user interface.

18 Claims, 7 Drawing Sheets

(51) Int. Cl.
*H04L 9/40* (2022.01)
*G06F 3/0482* (2013.01)

(58) Field of Classification Search
CPC ........ G06Q 50/163; H04L 63/08–0892; H04L 63/10–108
See application file for complete search history.

(56) References Cited

U.S. PATENT DOCUMENTS

| | | |
|---|---|---|
| 2012/0310695 A1 | 12/2012 | Kestenbaum |
| 2015/0106736 A1* | 4/2015 | Torman ................. G06F 21/629 715/745 |
| 2015/0235333 A1 | 8/2015 | Bangerter et al. |
| 2015/0254671 A1* | 9/2015 | Delk .................... G06Q 20/102 705/307 |
| 2017/0076287 A1 | 3/2017 | Hall |
| 2018/0322598 A1* | 11/2018 | Collins ................ G06Q 50/163 |

FOREIGN PATENT DOCUMENTS

| | | |
|---|---|---|
| JP | 2015045964 A | 3/2015 |
| KR | 101631544 B1 | 6/2014 |
| WO | 2005065421 A2 | 7/2005 |
| WO | 2016069765 A1 | 5/2016 |

\* cited by examiner

SYSTEM AND METHOD FOR PROVIDING CUSTOMIZABLE PROPERTY MANAGEMENT SERVICES ENABLING INCREASED TRANSPARENCY AND COMMUNICATION

CLAIM OF PRIORITY

This application is a United States non-provisional application and claims priority to U.S. Provisional Patent Application No. 62/563,436, filed Sep. 26, 2017, herein incorporated by reference in its entirety.

FIELD OF THE EMBODIMENTS

This invention relates to customer management and, in particular, to management and client service platforms that allow management companies to create a customizable transparent environment, providing clients and customers with a forum to interact and effectively communicate with all groups, members, and tenants in a virtual environment and space.

BACKGROUND OF THE EMBODIMENTS

There are many aspects to providing property management services. These aspects include caring for the grounds, fixing and maintaining structures on the grounds, receiving inquiries from client living on or renting the grounds, communicating with the clients, and other important services. Providing property management services is a complicated process and, as the number of clients increases, this complexity of providing property management services increases.

Many aspects of property management are time-consuming, with communication with clients contributing to a significant amount of time consumed by property management professionals. A system and method of easily and efficiently providing property management services is thus needed.

Examples of related art are described below:

U.S. Pat. No. 9,536,231 generally describes a computer-implemented method that includes receiving information that describes an issue with a building; accessing data that identifies (i) a plurality of components that are included in the building and (ii) features of the plurality of components; identifying one or more candidate components that have at least a threshold likelihood of being a cause of the issue; selecting a candidate service provider from among a plurality of service providers based on a comparison of (i) the one or more candidate components and (ii) information identifying technical qualifications for the plurality of service providers; transmitting a service request for the issue to the candidate service provider; receiving a response from the candidate service provider; and scheduling, based on the response, a service appointment with the candidate service provider to resolve the issue.

U.S. Patent Publication No. 2011/0289009 generally describes apparatuses, methods and systems for an activity tracking and property transaction facilitating hub ("HUB") that facilitates the generation, evaluation, and recording of information and activities related to property transactions and associated communications. In one implementation, the HUB dynamically generates an interface based on a user role, allows quick and efficient viewing of information relevant to an actual or potential property transaction, and records user activities or interactions to allow future access to a given interface state or set of relationships defined by interface element values, such as they may pertain to the given property transaction, an associated counterparty or contact, and/or the like. In one implementation, the HUB may provide a bifurcated display to allow for side-by-side visualization of required and available property information, attributes, and/or the like.

U.S. Patent Publication No. 2012/0310695 generally describes a service request management system that enables collaborative information sharing between an occupant of a building and an individual associated with building operations who is responsible for receiving, delegating, or performing a function related to the service request. The system includes one or more processors capable of receiving, from the occupant of the building, a new service request requesting a service or maintenance task to be performed for the occupant at the building, and storing the service request and related service request information in a service request database of the system. The processors are capable of enabling the individual to retrieve the service request from the service request database and to provide service request modification information to modify the service request information stored in the database. The processors are capable of updating the service request information stored in the database based on the service request modification information.

U.S. Patent Publication No. 2015/0235333 generally describes an apparatus to facilitate property rental, purchase, and management includes a user profile module, a property profile module, a notification module, a payment transaction module, and a renter evaluation module. The user profile module stores a user profile that includes biographical information, government issued identification, credit background, rental history, rental rating, and home purchasing preferences. The property profile module monitors a vacant rental property. The notification module schedules and sends alerts of one or more expected events to users. The payment transaction module transfers payments between users. The renter evaluation module determines whether a renter is a qualified potential homeowner.

U.S. Patent Publication No. 2015/0254671 generally describes service management systems and associated methods. In one embodiment, a service management system can include a system for delivering various types of services including property management services, residential rental services, social services, low income housing services, and/or the like. One aspect of the disclosure is directed toward a computer implemented service management process (e.g., a property management process) that includes maintaining an inventory of property associated with a rental program, providing information associated with the rental program, processing an application to enter the program from a potential program participant, and administering various program elements of the rental program. In selected embodiments, the method can further include providing products/services and/or providing advertising. In still further embodiments, the method can include terminating the program participant's participation in the rental program/service management process.

U.S. Patent Publication No. 2017/0076287 generally describes a system and method for selective processing of electronic payments such as rent or utility bill payments. Payer tenders an electronic payment through a web-based user interface and a notice is transmitted to Payee that funds are available for transfer if Payee chooses to accept the payment. Payee has the opportunity to review the details of the incoming payment and can choose to accept the payment, in which case, funds are transferred to Payee, or reject it, in which case the transfer of the funds is cancelled and no payment is made to the Payee.

None of the art described above addresses all of the issues that the present invention does.

SUMMARY OF THE EMBODIMENTS

According to an aspect of the present invention, a method is provided for providing property management services. The method includes receiving, using a graphical user interface coupled to an electronic device, login credentials for a user for access to a digital application for providing property management services, wherein the electronic device is coupled to one or more secondary electronic devices through one or more servers. The method further includes authenticating, using a processor coupled to the electronic device, an identity of the user, wherein the authenticating includes determining a user type for the user. The method additionally includes granting access to the user to a digital menu configured for the user type for the user, and displaying the digital menu to the user, using the graphical user interface.

It is an object of the present invention to provide the method for providing property management services, wherein the user type is selected from the group consisting of: administrator; power user; home owner; and vendor.

It is an object of the present invention to provide the method for providing property management services, wherein, if the user is authenticated as belonging to the administrator user type, the user is granted access to perform tasks selected from the group consisting of: editing an authentication table for use in authenticating the user; editing service tickets; deleting service tickets; creating announcements to be sent to one or more secondary users; editing the announcements; entering contact information; editing contact information; entering financial information; editing financial information; uploading documents; deleting documents; monitoring service tickets; sending out messages; sending online invites; and viewing reports.

It is an object of the present invention to provide the method for providing property management services, wherein, if the user is authenticated as belonging to the power use user type, the user is granted access to perform tasks selected from the group consisting of: creating announcements to be sent to one or more secondary users; editing the announcements; entering contact information; editing contact information; entering financial information; editing financial information; uploading documents; deleting documents; monitoring service tickets; sending out messages; sending online invites; and viewing reports.

It is an object of the present invention to provide the method for providing property management services, wherein, if the user is authenticated as belonging to the home owner user type, the user is granted access to perform tasks selected from the group consisting of: reading one or more announcements; reading financial information; downloading documents; performing payment functions; and opening one or more service tickets pertaining to one or more tasks to be completed.

It is an object of the present invention to provide the method for providing property management services, wherein, if the user is authenticated as belonging to the vendor user type, the user is granted access to perform tasks selected from the group consisting of: reading one or more service tickets pertaining to one or more tasks to be completed; and changing a status of at least one of the one or more service tickets.

It is an object of the present invention to provide the method for providing property management services, wherein the method further includes customizing the digital menu for each user type.

It is an object of the present invention to provide the method for providing property management services, wherein the customizing further includes altering one or more functions of the digital application using a low-code development platform.

It is an object of the present invention to provide the method for providing property management services, wherein the method further includes enabling communication between two or more users using the digital application.

According to another aspect of the present invention, a system is provided for providing property management services. The system includes a memory configured to store a digital application for providing property management services and a graphical user interface, coupled to an electronic device, configured to receive login credentials for a user for access to the digital application for providing property management services, wherein the electronic device is coupled to one or more secondary electronic devices through one or more servers. The system further includes a processor configured to authenticate an identity of the user, determine a user type for the user, and grant access to the user to a digital menu configured for the user type for the user, wherein the graphical user interface is further configured to display the digital menu to the user, using the graphical user interface.

It is an object of the present invention to provide the system for providing property management services, wherein the user type is selected from the group consisting of: administrator; power user; home owner; and vendor.

It is an object of the present invention to provide the system for providing property management services, wherein, if the user is authenticated as belonging to the administrator user type, the user is granted access to perform tasks selected from the group consisting of: editing an authentication table for use in authenticating the user; editing service tickets; deleting service tickets; creating announcements to be sent to one or more secondary users; editing the announcements; entering contact information; editing contact information; entering financial information; editing financial information; uploading documents; deleting documents; monitoring service tickets; sending out messages; sending online invites; and viewing reports.

It is an object of the present invention to provide the system for providing property management services, wherein, if the user is authenticated as belonging to the power use user type, the user is granted access to perform tasks selected from the group consisting of: creating announcements to be sent to one or more secondary users; editing the announcements; entering contact information; editing contact information; entering financial information; editing financial information; uploading documents; deleting documents; monitoring service tickets; sending out messages; sending online invites; and viewing reports.

It is an object of the present invention to provide the system for providing property management services, wherein, if the user is authenticated as belonging to the home owner user type, the user is granted access to perform tasks selected from the group consisting of: reading one or more announcements; reading financial information; downloading documents; performing payment functions; and opening one or more service tickets pertaining to one or more tasks to be completed.

It is an object of the present invention to provide the system for providing property management services, wherein, if the user is authenticated as belonging to the vendor user type, the user is granted access to perform tasks selected from the group consisting of: reading one or more service tickets pertaining to one or more tasks to be completed; and changing a status of at least one of the one or more service tickets.

It is an object of the present invention to provide the system for providing property management services, wherein the digital application is configured to enable customization of the digital menu for each user type.

It is an object of the present invention to provide the system for providing property management services, wherein the digital application is configured to enable customization of the digital menu such that one or more functions of the digital application can be altered using a low-code development platform.

It is an object of the present invention to provide the system for providing property management services, wherein the server is configured to enable communication between two or more users using the digital application is enabled.

DESCRIPTION OF THE PREFERRED EMBODIMENTS

Figure 1:
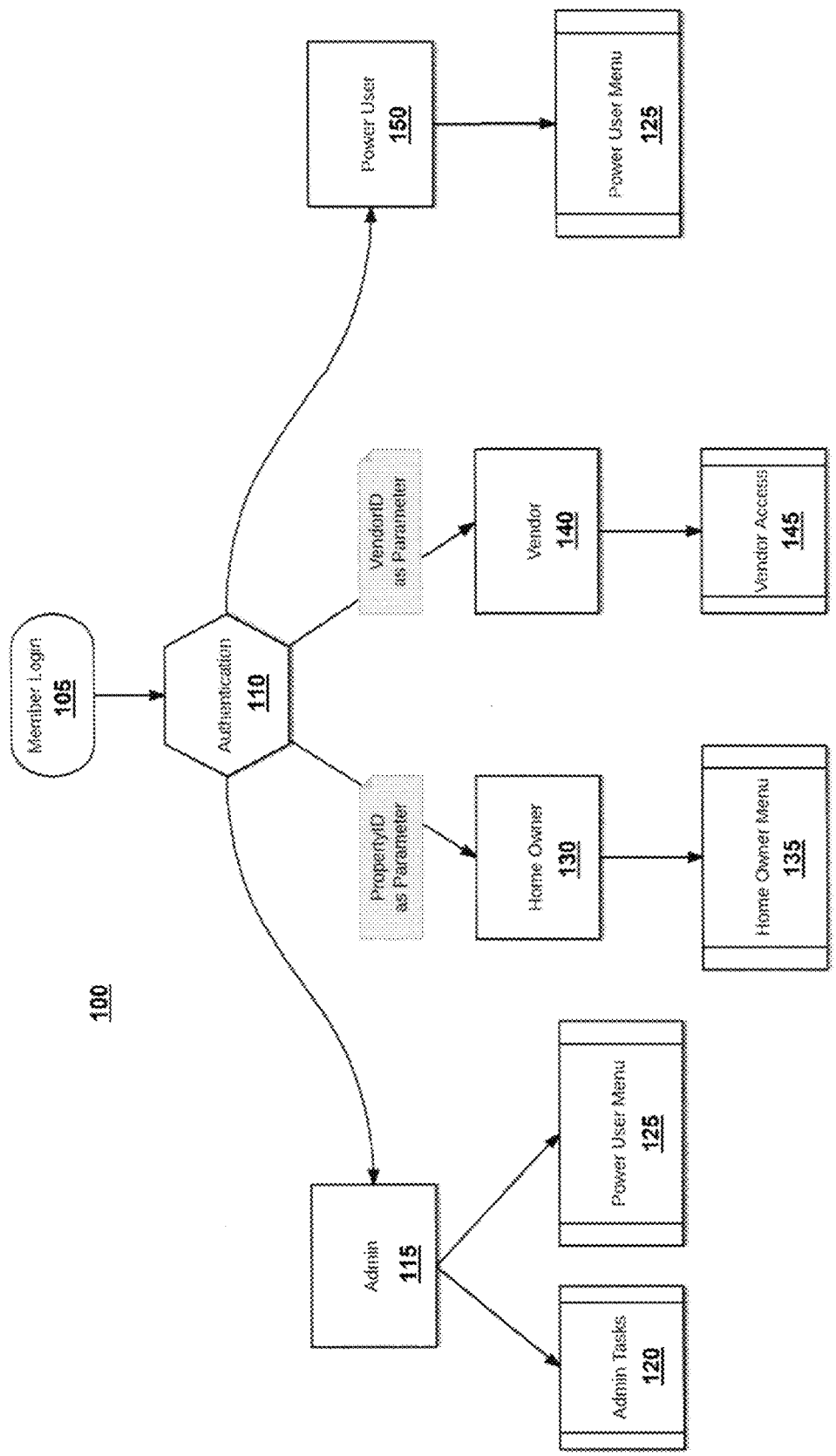
FIG. 1 shows a block/flow diagram of a method/process for providing property management services, according to an embodiment of the present invention.

The preferred embodiments of the present invention will now be described with reference to the drawings. Identical elements in the various figures are identified with the same reference numerals.

Reference will now be made in detail to each embodiment of the present invention. Such embodiments are provided by way of explanation of the present invention, which is not intended to be limited thereto. In fact, those of ordinary skill in the art may appreciate upon reading the present specification and viewing the present drawings that various modifications and variations can be made thereto.

Referring now to FIG. 1, a block/flow diagram of a method/process 100 for providing property management services is illustratively depicted, in accordance with an embodiment of the present invention.

According to an embodiment, a user/member/etc., at 105, logs into a digital application for providing property management services. The login 105 may include, e.g., typographical login credentials (e.g., username and password) and/or any other suitable form of login credentials.

According to an embodiment, the digital application may be an application one or more suitable electronic devices, such as, e.g., a desktop computer, a laptop computer, a tablet computer, a smartphone, and/or any other suitable electronic device. According to an embodiment, the digital application acts as a property management portal. According to an embodiment, the digital application acts as a management and client service platform that allows management companies to create a customizable transparent environment which provides to clients and customers a forum to interact and effectively communicate with all groups, members, and/or tenants in a virtual environment/space.

According to an embodiment, once the user inputs the login credentials and logs in 105, the user's identification, at 110, is authenticated. According to an embodiment, the authentication process 110 determines the type of user the user is. According to an embodiment, the user types include, e.g., Administrators 115, Home Owners 130, Vendors 140, and Power Users 150. According to an embodiment, all authentication processes are performed by a remote server.

According to an embodiment, if the authentication process 110 determines that the user is an Administrator 115, the digital application grants the user access to an administrative tasks menu 120 and/or a power user menu 125.

According to an embodiment, if the authentication process 110 determines that the user is a home owner 130, the digital application grants the user access to a home owners menu 135. The user's identity as a home owner 130 may be based on a PropertyID parameter and/or any other suitable parameter.

According to an embodiment, if the authentication process 110 determines that the user is a vendor 140, the digital application grants the user access to a vendor access menu 145. The user's identity as a vendor 140 may be based on a VendorID parameter and/or any other suitable parameter.

According to an embodiment, if the authentication process 110 determines that the user is a power user 150, the digital application grants the user access to the power user menu 125.

Figure 2:
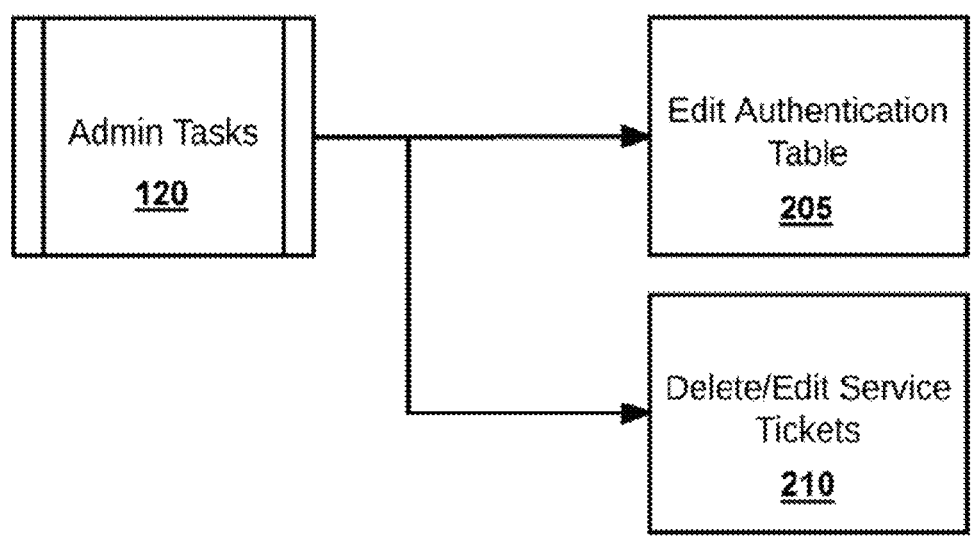
FIG. 2 shows a block/flow diagram of a method/process of performing administrative tasks using a digital application for providing property management services, according to an embodiment of the present invention.

Referring now to FIG. 2, a block/flow diagram of a method/process 200 of performing administrative tasks using the digital application for providing property management services is illustratively depicted, in accordance with an embodiment of the present invention.

According to an embodiment, the administrative tasks menu 120 includes an option to edit an authentication table 205 for determining which user types to assign users during authentication 110. According to an embodiment, the administrative tasks menu 120 includes an option to edit and/or delete any service tickets 210. It is noted, however, that other suitable administrative tasks may also be performed using the administrative tasks menu 120, while maintaining the spirit of the present invention.

Figure 3:
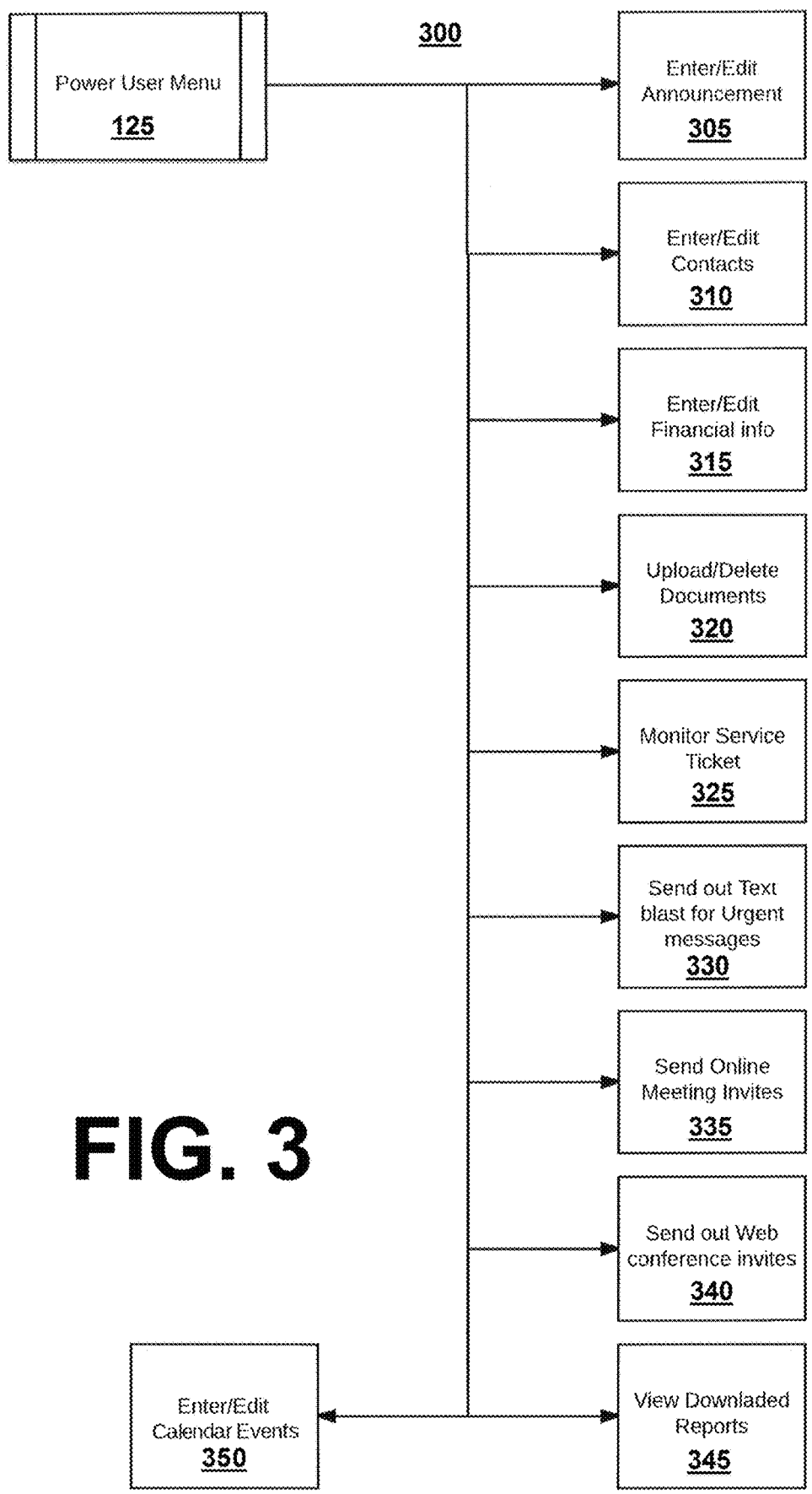
FIG. 3 shows a block/flow diagram of a method/process for selecting functions using a power user menu using a digital application for providing property management services, according to an embodiment of the present invention.

Referring now to FIG. 3, a block/flow diagram of a method/process 300 for selecting functions using a power user menu 125 using the digital application for providing property management services is illustratively depicted, in accordance with an embodiment of the present invention.

According to an embodiment, the power user menu 125 is accessible by the administrator 115 and/or the power users 150, According to an embodiment, the power user menu 125 enables authorized users to enter and edit announcements 305 that are to be sent to other users. According to an embodiment, the designated users receive a notification upon receiving the announcement. According to an embodiment, the power user menu 125 further enables authorized users to enter and edit contacts 310, enter and edit various financial information 315, and/or upload and delete various documents 320.

According to an embodiment, the power user menu 125 is configured to enable authorized users to manage service tickets by monitoring various service tickets 325 and following up on various matters related to the service tickets.

According to an embodiment, the power user menu 125 is configured to enable authorized users to contact one or more individuals. For example, the power user menu 125 may be user to send out text blasts (or other suitable forms of communication) in the event that urgent messages need to be sent. The power user menu 125 may also be used to send out online meeting invites 335 and web conference invites 340.

According to an embodiment, the power user menu 125 may also be used in viewing, analyzing, and downloading various types of reports 345, enabling authorized users to more effectively manage the digital application.

According to an embodiment, the power user menu 125 may also be used in viewing, entering, deleting, and/or editing calendar events 350.

Figure 4:
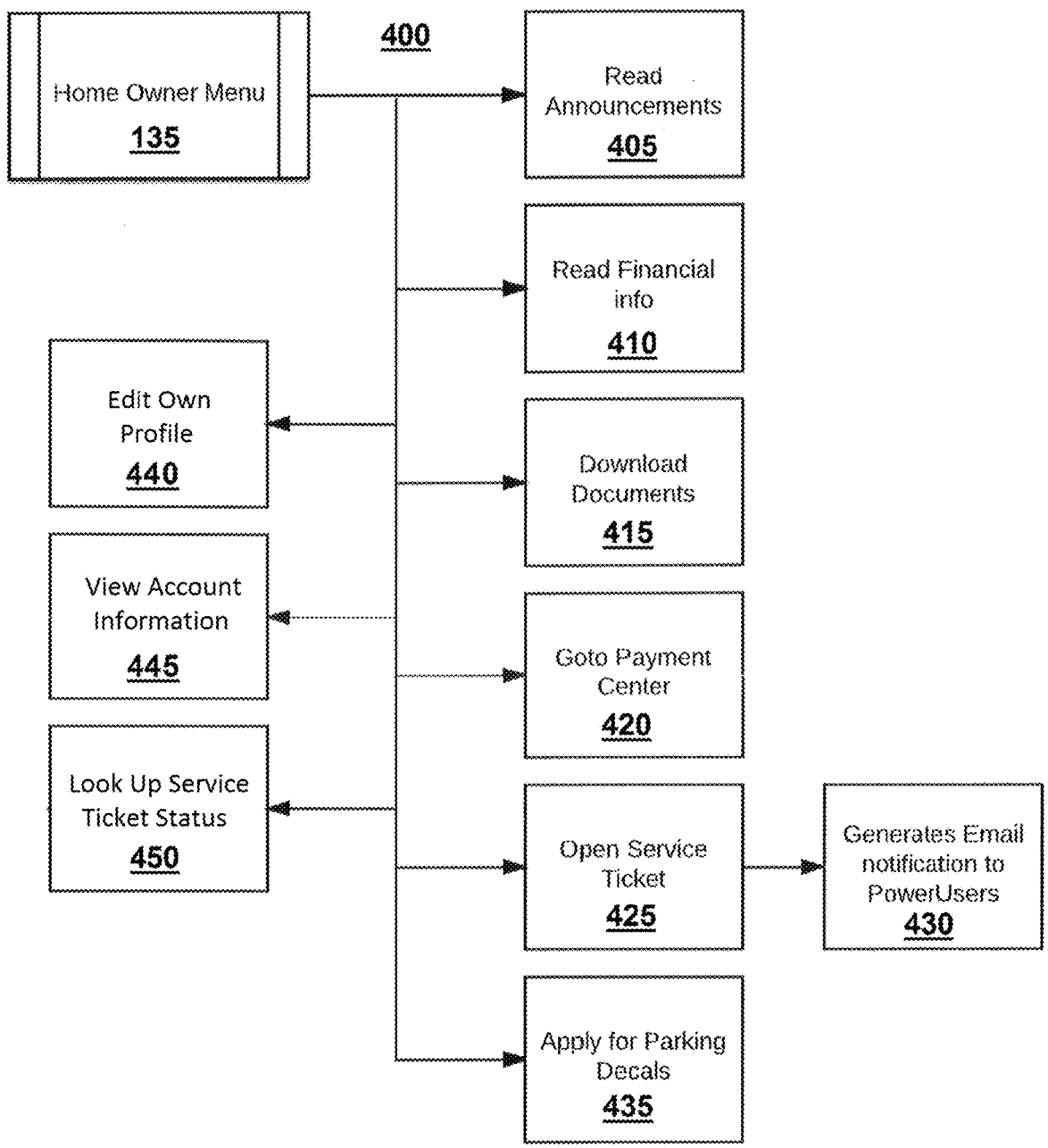
FIG. 4 shows a block/flow diagram of a method/process for using a home owner menu using a digital application for providing property management services, according to an embodiment of the present invention.

Referring now to FIG. 4, a block/flow diagram of a method/process 400 for using a home owner menu 135 using the digital application for providing property management services is illustratively depicted, in accordance with an embodiment of the present invention.

According to an embodiment, the home owner menu 135 is configured to enable a user to perform a variety of functions. According to an embodiment, these functions include the ability to read announcements 405, read financial information 410, and download documents 415. According to an embodiment, the announcements, financial information, and/or documents for download are uploaded and/or sent to the home owner 130 by an administrator 115 and/or a power user 150. According to an embodiment, the announcements, financial information, and/or documents for download may be uploaded and/or sent to the home owner 130 by a home owner 130 and/or a vendor 140.

According to an embodiment, the home owner menu 135 is configured to enable home owners 130 to make payments by going to a payment center 420. According to an embodiment, the payment center 420 includes a listing of any payments due, a section for inputting payment information, a listing of all or some of the payments made by the home owner 130, and/or any other suitable payment lists and/or functions.

According to an embodiment, the home owner menu 135 is configured to enable a home owner 130 to open a service ticket 425 to request that one or more services are to be completed. According to an embodiment, once the service ticket is generated, the digital application generates an email (or other means of communication) 430 to one or more power users 150 for follow-up and resolution of the service or services requested in the service ticket.

Home owners 130 may need to make other types of requests for services and/or other items. For example, according to an embodiment, the home owner menu 135 is configured to enable the home owner 130 to apply for parking decals 435 in the event that parking decals are needed or required. It is noted that the home owner menu 135 may further be configured to enable a home owner 135 to request any number of suitable goods and/or services.

According to an embodiment, the home owner menu 135 is further configured to enable the home owner 130 to edit the home owner's profile 440, view the home owner's account information 445, look up the status of one or more service tickets 450, and/or any other suitable functions.

Figure 5:
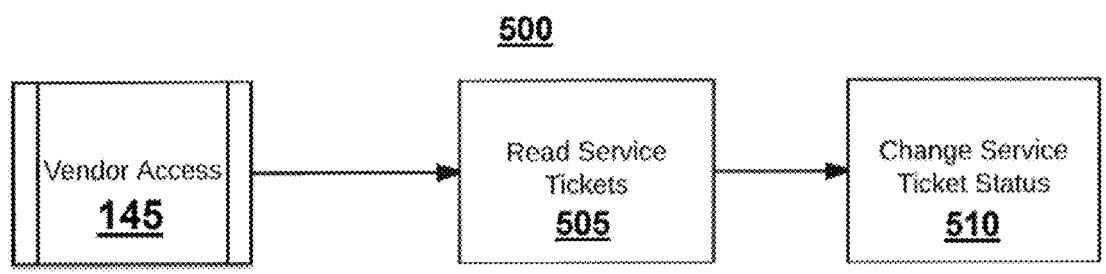
FIG. 5 shows a system for performing vendor tasks using a digital application for providing property management services, according to an embodiment of the present invention.

Referring now to FIG. 5, a block/flow diagram of a method/process for performing vendor 140 tasks using a digital application for providing property management services is illustratively depicted, in accordance with an embodiment of the present invention.

According to an embodiment, the service tickets are sent to one or more vendors 140 for viewing. The vendor access menu 145 is configured to enable vendors 140 to read and view the service tickets 505. According to an embodiment, the vendor access menu 145 further enables vendors 140 to change a status of the service tickets 510. For example, once the request on a service ticket is completed, the vendor 140 may use the vendor access menu 145 to change the status of the service ticket to, e.g., "completed", "finished", etc.

Figure 6:
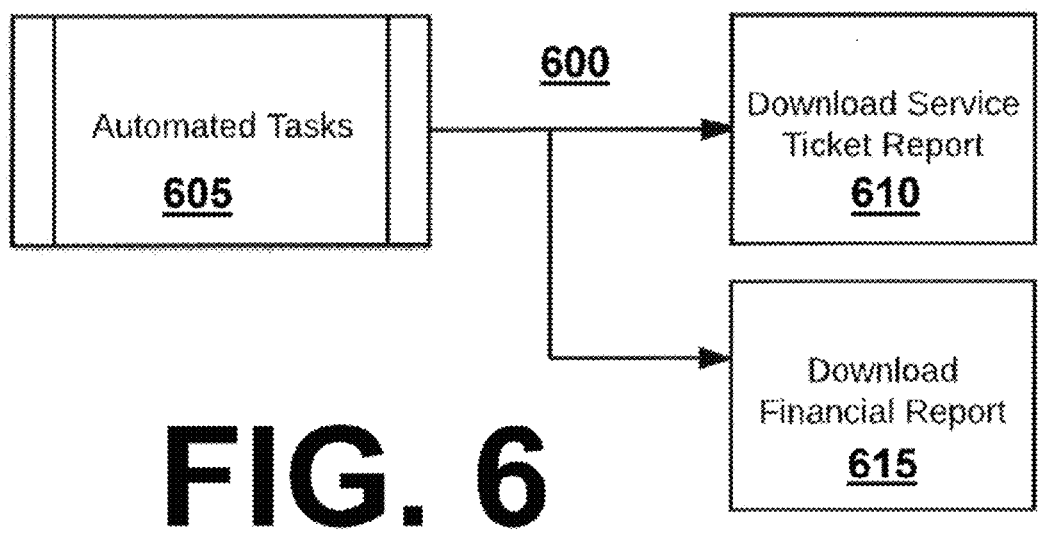
FIG. 6 shows a block/flow diagram of a method/process of performing automated tasks using a digital application for providing property management services, according to an embodiment of the present invention.

Referring now to FIG. 6, a block/flow diagram of a method/process 600 of performing automated tasks 605 using the digital application for providing property management services is illustratively depicted, in accordance with an embodiment of the present invention.

According to an embodiment, the digital application performs one or more automated tasks. These tasks may include, e.g., downloading service ticket reports 610, downloading financial reports 615, and/or downloading any other relevant reports. It is noted, however, that the digital application may be programmed to automatically perform any suitable task.

Figure 7:
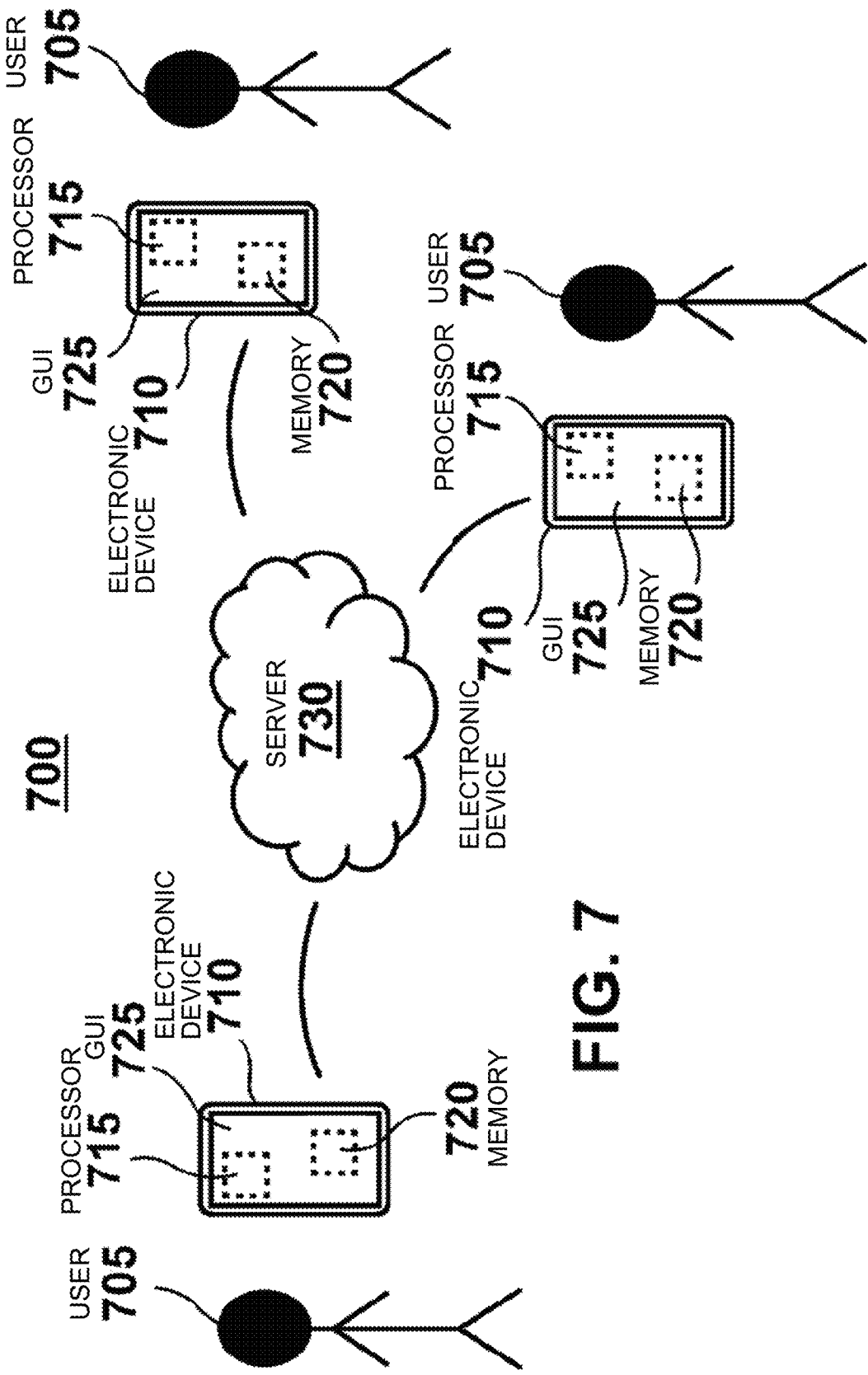
FIG. 7 shows a block/flow diagram of a system for providing property management services, according to an embodiment of the present invention.

Referring now to FIG. 7, a system 700 for providing property management services is illustratively depicted, in accordance with an embodiment of the present invention.

According to an embodiment, the system 700 includes one or more users 705 connected to a server 730 through one or more electronic devices 710. According to an embodiment, one or more electronic devices may include a desktop computer, a laptop computer, a tablet computer, a smartphone, and/or any other suitable electronic device. The electronic devices 710 may include a processor 715 and a memory 720. According to an embodiment, the electronic devices may further include a graphical user interface 725 configured to enable a user 705 to interact with the electronic device 710.

According to an embodiment, the one or more electronic devices 710 are connected to the server 730 through a wired and/or wireless connection. According to an embodiment, the server 730 is a cloud-based server. According to an embodiment, the server 730 is further configured to store memory.

The digital application may be stored on one or more of the electronic devices 710 and/or on the server 730. According to an embodiment, the system is configured to provide users with secure storage of all records in an online data base environment and to also provide substantial record retention to each and every group or client. According to an embodiment, the users 705 may be organized as individuals and/or as part of a group of users 705.

According to an embodiment, the system 700 is configured such that the users 705 are enabled to communicate with all clients, members and/or tenants for notification (via text, email, Internet, and/or any other suitable communication medium). According to an embodiment, the system 700 is also configured to provide event calendaring and necessary notification reporting.

According to an embodiment, the system 700 is configured such that, through the server 730, the users 705 are able to communication through group conferencing within the digital environment.

According to an embodiment, the system 700 and digital application are configured such that Administrative Staff 115 and other types of users 705 are enabled to store data which can be further utilized to create customizable reporting while allowing administrative staff 115 to track reporting which will enhance and improve communication, thereby improving upon the existing technologies. According to various embodiments of the present invention, the software used with the present invention may be configured to enable revisions, improvements, and enhancements.

The system 700 and digital application are configured such that they provide a one-stop customer support portal for needs such as Parking Decal Pool Application, Payment center access and monitoring of payment.

According to an embodiment, the digital application, which is run using the server 730 and/or one or more of the processors 715, is built and customized using a low-code development platform, in which the various functions of the digital application, rather than being coded, are configured into the final application. This reduces the development speed of developing and deploying property management software, thus also reducing the costs associated with such development and deployment, thus also providing an improvement over the existing computer-based property management technologies.

According to an embodiment, the low-code development platform further enables users 705 to effectively customize the digital application to their choosing, creating a modular configuration that enables users 705 to select and choose options the users 705 deem pertinent. This also enables the digital application to be tailored to every user 705, to fit the user's 705 needs with very little code modification and time.

According to an embodiment, the system 700 enables third parties to engage in commerce independently through the digital application. The system 700 also supports a robust reporting system that can be accessed by the users 700 (e.g., homeowners, tenants, etc.) which alleviates the burden of the property management companies to track and monitor service flow. This thus shifts the burden of tracking and monitoring service request and would allow property management companies to rate performance and evaluate customer satisfaction and improve relations.

Systems, Devices and Operating Systems

Typically, a user or users, which may be people or groups of users and/or other systems, may engage information technology systems (e.g., computers) to facilitate operation of the system and information processing. In turn, computers employ processors to process information and such processors may be referred to as central processing units (CPU). One form of processor is referred to as a microprocessor. CPUs use communicative circuits to pass binary encoded signals acting as instructions to enable various operations. These instructions may be operational and/or data instructions containing and/or referencing other instructions and data in various processor accessible and operable areas of memory (e.g., registers, cache memory, random access memory, etc.). Such communicative instructions may be stored and/or transmitted in batches (e.g., batches of instructions) as programs and/or data components to facilitate desired operations. These stored instruction codes, e.g., programs, may engage the CPU circuit components and other motherboard and/or system components to perform desired operations. One type of program is a computer operating system, which, may be executed by CPU on a computer; the operating system enables and facilitates users to access and operate computer information technology and resources. Some resources that may be employed in information technology systems include: input and output mechanisms through which data may pass into and out of a computer; memory storage into which data may be saved; and processors by which information may be processed. These information technology systems may be used to collect data for later retrieval, analysis, and manipulation, which may be facilitated through a database program. These information technology systems provide interfaces that allow users to access and operate various system components.

In one embodiment, the present invention may be connected to and/or communicate with entities such as, but not limited to: one or more users from user input devices; peripheral devices; an optional cryptographic processor device; and/or a communications network. For example, the present invention may be connected to and/or communicate with users, operating client device(s), including, but not limited to, personal computer(s), server(s) and/or various mobile device(s) including, but not limited to, cellular telephone(s), smartphone(s) (e.g., iPhone®, Blackberry®, Android OS-based phones etc.), tablet computer(s) (e.g., Apple iPad™ HP Slate™, Motorola Xoom™, etc.), eBook reader(s) (e.g., Amazon Kindle™, Barnes and Noble's Nook™ eReader, etc.), laptop computer(s), notebook(s), netbook(s), gaming console(s) (e.g., XBOX Live™, Nintendo® DS, Sony PlayStation® Portable, etc.), portable scanner(s) and/or the like.

Networks are commonly thought to comprise the interconnection and interoperation of clients, servers, and intermediary nodes in a graph topology. It should be noted that the term "server" as used throughout this application refers generally to a computer, other device, program, or combination thereof that processes and responds to the requests of remote users across a communications network. Servers serve their information to requesting "clients." The term "client" as used herein refers generally to a computer, program, other device, user and/or combination thereof that is capable of processing and making requests and obtaining and processing any responses from servers across a communications network. A computer, other device, program, or combination thereof that facilitates, processes information and requests, and/or furthers the passage of information from a source user to a destination user is commonly referred to as a "node." Networks are generally thought to facilitate the transfer of information from source points to destinations. A node specifically tasked with furthering the passage of information from a source to a destination is commonly called a "router." There are many forms of networks such as Local Area Networks (LANs), Pico networks, Wide Area Networks (WANs), Wireless Networks (WLANs), etc. For example, the Internet is generally accepted as being an interconnection of a multitude of networks whereby remote clients and servers may access and interoperate with one another.

The present invention may be based on computer systems that may comprise, but are not limited to, components such as: a computer systemization connected to memory.

Computer Systemization

A computer systemization may comprise a clock, central processing unit ("CPU(s)" and/or "processor(s)" (these terms are used interchangeable throughout the disclosure unless noted to the contrary)), a memory (e.g., a read only memory (ROM), a random access memory (RAM), etc.), and/or an interface bus, and most frequently, although not necessarily, are all interconnected and/or communicating through a system bus on one or more (mother)board(s) having conductive and/or otherwise transportive circuit pathways through which instructions (e.g., binary encoded signals) may travel to effect communications, operations, storage, etc. Optionally, the computer systemization may be connected to an internal power source; e.g., optionally the power source may be internal. Optionally, a cryptographic processor and/or transceivers (e.g., ICs) may be connected to the system bus. In another embodiment, the cryptographic processor and/or transceivers may be connected as either internal and/or external peripheral devices via the interface bus I/O. In turn, the transceivers may be connected to antenna(s), thereby effectuating wireless transmission and reception of various communication and/or sensor protocols; for example the antenna(s) may connect to: a Texas Instruments WiLink WL1283 transceiver chip (e.g., providing 802.11n, Bluetooth 3.0, FM, global positioning system (GPS) (thereby allowing the controller of the present invention to determine its location)); Broadcom BCM4329FKUBG transceiver chip (e.g., providing 802.11n, Bluetooth 2.1+EDR, FM, etc.); a Broadcom BCM4750IUB8 receiver chip (e.g., GPS); an Infineon Technologies X-Gold 618-PMB9800 (e.g., providing 2G/3G HSDPA/HSUPA communications); and/or the like. The system clock typically has a crystal oscillator and generates a base signal through the computer systemization's circuit pathways. The clock is typically coupled to the system bus and various clock multipliers that will increase or decrease the base operating frequency for other components interconnected in the computer systemization. The clock and various components in a computer systemization drive signals embodying information throughout the system. Such transmission and reception of instructions embodying information throughout a computer systemization may be commonly referred to as communications. These communicative instructions may further be transmitted, received, and the cause of return and/or reply communications beyond the instant computer systemization to: communications networks, input devices, other computer systemizations, peripheral devices, and/or the like. Of course, any of the above components may be connected directly to one another, connected to the CPU, and/or organized in numerous variations employed as exemplified by various computer systems.

The CPU comprises at least one high-speed data processor adequate to execute program components for executing user and/or system-generated requests. Often, the processors themselves will incorporate various specialized processing units, such as, but not limited to: integrated system (bus) controllers, memory management control units, floating point units, and even specialized processing sub-units like graphics processing units, digital signal processing units, and/or the like. Additionally, processors may include internal fast access addressable memory, and be capable of mapping and addressing memory beyond the processor itself; internal memory may include, but is not limited to: fast registers, various levels of cache memory (e.g., level 1, 2, 3, etc.), RAM, etc. The processor may access this memory through the use of a memory address space that is accessible via instruction address, which the processor can construct and decode allowing it to access a circuit path to a specific memory address space having a memory state. The CPU may be a microprocessor such as: AMD's Athlon, Duron and/or Opteron; ARM's application, embedded and secure processors; IBM and/or Motorola's DragonBall and PowerPC; IBM's and Sony's Cell processor; Intel's Celeron, Core (2) Duo, Itanium, Pentium, Xeon, and/or XScale; and/or the like processor(s). The CPU interacts with memory through instruction passing through conductive and/or transportive conduits (e.g., (printed) electronic and/or optic circuits) to execute stored instructions (i.e., program code) according to conventional data processing techniques. Such instruction passing facilitates communication within the present invention and beyond through various interfaces. Should processing requirements dictate a greater amount speed and/or capacity, distributed processors (e.g., Distributed embodiments of the present invention), mainframe, multi-core, parallel, and/or super-computer architectures may similarly be employed. Alternatively, should deployment requirements dictate greater portability, smaller Personal Digital Assistants (PDAs) may be employed.

Depending on the particular implementation, features of the present invention may be achieved by implementing a microcontroller such as CAST's R8051XC2 microcontroller; Intel's MCS 51 (i.e., 8051 microcontroller); and/or the like. Also, to implement certain features of the various embodiments, some feature implementations may rely on embedded components, such as: Application-Specific Integrated Circuit ("ASIC"), Digital Signal Processing ("DSP"), Field Programmable Gate Array ("FPGA"), and/or the like embedded technology. For example, any of the component collection (distributed or otherwise) and/or features of the present invention may be implemented via the microprocessor and/or via embedded components; e.g., via ASIC, coprocessor, DSP, FPGA, and/or the like. Alternately, some implementations of the present invention may be implemented with embedded components that are configured and used to achieve a variety of features or signal processing.

Depending on the particular implementation, the embedded components may include software solutions, hardware solutions, and/or some combination of both hardware/software solutions. For example, features of the present invention discussed herein may be achieved through implementing FPGAs, which are a semiconductor devices containing programmable logic components called "logic blocks", and programmable interconnects, such as the high performance FPGA Virtex series and/or the low cost Spartan series manufactured by Xilinx. Logic blocks and interconnects can be programmed by the customer or designer, after the FPGA is manufactured, to implement any of the features of the present invention. A hierarchy of programmable interconnects allow logic blocks to be interconnected as needed by the system designer/administrator of the present invention, somewhat like a one-chip programmable breadboard. An FPGA's logic blocks can be programmed to perform the function of basic logic gates such as AND, and XOR, or more complex combinational functions such as decoders or simple mathematical functions. In most FPGAs, the logic blocks also include memory elements, which may be simple flip-flops or more complete blocks of memory. In some circumstances, the present invention may be developed on regular FPGAs and then migrated into a fixed version that more resembles ASIC implementations. Alternate or coordinating implementations may migrate features of the controller of the present invention to a final ASIC instead of or in addition to FPGAs. Depending on the implementation all of the aforementioned embedded components and microprocessors may be considered the "CPU" and/or "processor" for the present invention.

Power Source

The power source may be of any standard form for powering small electronic circuit board devices such as the following power cells: alkaline, lithium hydride, lithium ion, lithium polymer, nickel cadmium, solar cells, and/or the like. Other types of AC or DC power sources may be used as well. In the case of solar cells, in one embodiment, the case provides an aperture through which the solar cell may capture photonic energy. The power cell is connected to at least one of the interconnected subsequent components of the present invention thereby providing an electric current to all subsequent components. In one example, the power source is connected to the system bus component. In an alternative embodiment, an outside power source is provided through a connection across the I/O interface. For example, a USB and/or IEEE 1394 connection carries both data and power across the connection and is therefore a suitable source of power.

Interface Adapters

Interface bus(ses) may accept, connect, and/or communicate to a number of interface adapters, conventionally although not necessarily in the form of adapter cards, such as but not limited to: input output interfaces (I/O), storage interfaces, network interfaces, and/or the like. Optionally, cryptographic processor interfaces similarly may be connected to the interface bus. The interface bus provides for the communications of interface adapters with one another as well as with other components of the computer systemization. Interface adapters are adapted for a compatible interface bus. Interface adapters conventionally connect to the interface bus via a slot architecture. Conventional slot architectures may be employed, such as, but not limited to: Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and/or the like.

Storage interfaces may accept, communicate, and/or connect to a number of storage devices such as, but not limited to: storage devices, removable disc devices, and/or the like. Storage interfaces may employ connection protocols such as, but not limited to: (Ultra) (Serial) Advanced Technology Attachment (Packet Interface) ((Ultra) (Serial) ATA(PI)), (Enhanced) Integrated Drive Electronics ((E)IDE), Institute of Electrical and Electronics Engineers (IEEE) 1394, fiber channel, Small Computer Systems Interface (SCSI), Universal Serial Bus (USB), and/or the like.

Network interfaces may accept, communicate, and/or connect to a communications network. Through a communications network, the controller of the present invention is accessible through remote clients (e.g., computers with web browsers) by users. Network interfaces may employ connection protocols such as, but not limited to: direct connect, Ethernet (thick, thin, twisted pair 10/100/1000 Base T, and/or the like), Token Ring, wireless connection such as IEEE 802.11a-x, and/or the like. Should processing requirements dictate a greater amount speed and/or capacity, distributed network controllers (e.g., Distributed embodiments of the present invention), architectures may similarly be employed to pool, load balance, and/or otherwise increase the communicative bandwidth required by the controller of the present invention. A communications network may be any one and/or the combination of the following: a direct interconnection; the Internet; a Local Area Network (LAN); a Metropolitan Area Network (MAN); an Operating Missions as Nodes on the Internet (OMNI); a secured custom connection; a Wide Area Network (WAN); a wireless network (e.g., employing protocols such as, but not limited to a Wireless Application Protocol (WAP), I-mode, and/or the like); and/or the like. A network interface may be regarded as a specialized form of an input output interface. Further, multiple network interfaces may be used to engage with various communications network types. For example, multiple network interfaces may be employed to allow for the communication over broadcast, multicast, and/or unicast networks.

Input Output interfaces (I/O) may accept, communicate, and/or connect to user input devices, peripheral devices, cryptographic processor devices, and/or the like. I/O may employ connection protocols such as, but not limited to: audio: analog, digital, monaural, RCA, stereo, and/or the like; data: Apple Desktop Bus (ADB), IEEE 1394a-b, serial, universal serial bus (USB); infrared; joystick; keyboard; midi; optical; PC AT; PS/2; parallel; radio; video interface: Apple Desktop Connector (ADC), BNC, coaxial, component, composite, digital, Digital Visual Interface (DVI), high-definition multimedia interface (HDMI), RCA, RF antennae, S-Video, VGA, and/or the like; wireless transceivers: 802.11a/b/g/n/x; Bluetooth; cellular (e.g., code division multiple access (CDMA), high speed packet access (HSPA(+)), high-speed downlink packet access (HSDPA), global system for mobile communications (GSM), long term evolution (LTE), WiMax, etc.); and/or the like. One typical output device may include a video display, which typically comprises a Cathode Ray Tube (CRT) or Liquid Crystal Display (LCD) based monitor with an interface (e.g., DVI circuitry and cable) that accepts signals from a video interface, may be used. The video interface composites information generated by a computer systemization and generates video signals based on the composited information in a video memory frame. Another output device is a television set, which accepts signals from a video interface. Typically, the video interface provides the composited video information through a video connection interface that accepts a video display interface (e.g., an RCA composite video connector accepting an RCA composite video cable; a DVI connector accepting a DVI display cable, etc.).

User input devices often are a type of peripheral device (see below) and may include: card readers, dongles, finger print readers, gloves, graphics tablets, joysticks, keyboards, microphones, mouse (mice), remote controls, retina readers, touch screens (e.g., capacitive, resistive, etc.), trackballs, trackpads, sensors (e.g., accelerometers, ambient light, GPS, gyroscopes, proximity, etc.), styluses, and/or the like.

Peripheral devices may be external, internal and/or part of the controller of the present invention. Peripheral devices may also include, for example, an antenna, audio devices (e.g., line-in, line-out, microphone input, speakers, etc.), cameras (e.g., still, video, webcam, etc.), drive motors, lighting, video monitors and/or the like.

Cryptographic units such as, but not limited to, microcontrollers, processors, interfaces, and/or devices may be attached, and/or communicate with the controller of the present invention. A MC68HC16 microcontroller, manufactured by Motorola Inc., may be used for and/or within cryptographic units. The MC68HC16 microcontroller utilizes a 16-bit multiply-and-accumulate instruction in the 16

MHz configuration and requires less than one second to perform a 512-bit RSA private key operation. Cryptographic units support the authentication of communications from interacting agents, as well as allowing for anonymous transactions. Cryptographic units may also be configured as part of CPU. Equivalent microcontrollers and/or processors may also be used. Other commercially available specialized cryptographic processors include: the Broadcom's CryptoNetX and other Security Processors; nCipher's nShield, SafeNet's Luna PCI (e.g., 7100) series; Semaphore Communications' 40 MHz Roadrunner 184; Sun's Cryptographic Accelerators (e.g., Accelerator 6000 PCIe Board, Accelerator 500 Daughtercard); Via Nano Processor (e.g., L2100, L2200, U2400) line, which is capable of performing 500+MB/s of cryptographic instructions; VLSI Technology's 33 MHz 6868; and/or the like.

Memory

Generally, any mechanization and/or embodiment allowing a processor to affect the storage and/or retrieval of information is regarded as memory. However, memory is a fungible technology and resource, thus, any number of memory embodiments may be employed in lieu of or in concert with one another. It is to be understood that the controller of the present invention and/or a computer systemization may employ various forms of memory. For example, a computer systemization may be configured wherein the functionality of on-chip CPU memory (e.g., registers), RAM, ROM, and any other storage devices are provided by a paper punch tape or paper punch card mechanism; of course such an embodiment would result in an extremely slow rate of operation. In a typical configuration, memory will include ROM, RAM, and a storage device. A storage device may be any conventional computer system storage. Storage devices may include a drum; a (fixed and/or removable) magnetic disk drive; a magneto-optical drive; an optical drive (i.e., Blueray, CD ROM/RAM/Recordable (R)/ ReWritable (RW), DVD R/RW, HD DVD R/RW etc.); an array of devices (e.g., Redundant Array of Independent Disks (RAID)); solid state memory devices (USB memory, solid state drives (SSD), etc.); other processor-readable storage mediums; and/or other devices of the like. Thus, a computer systemization generally requires and makes use of memory.

Component Collection

The memory may contain a collection of program and/or database components and/or data such as, but not limited to: operating system component(s) (operating system); information server component(s) (information server); user interface component(s) (user interface); Web browser component(s) (Web browser); database(s); mail server component(s); mail client component(s); cryptographic server component(s) (cryptographic server) and/or the like (i.e., collectively a component collection). These components may be stored and accessed from the storage devices and/or from storage devices accessible through an interface bus. Although non-conventional program components such as those in the component collection, typically, are stored in a local storage device, they may also be loaded and/or stored in memory such as: peripheral devices, RAM, remote storage facilities through a communications network, ROM, various forms of memory, and/or the like.

Operating System

The operating system component is an executable program component facilitating the operation of the controller of the present invention. Typically, the operating system facilitates access of I/O, network interfaces, peripheral devices, storage devices, and/or the like. The operating system may be a highly fault tolerant, scalable, and secure system such as: Apple Macintosh OS X (Server); AT&T Plan 9; Be OS; Unix and Unix-like system distributions (such as AT&T's UNIX; Berkley Software Distribution (BSD) variations such as FreeBSD, NetBSD, OpenBSD, and/or the like; Linux distributions such as Red Hat, Ubuntu, and/or the like); and/or the like operating systems. However, more limited and/or less secure operating systems also may be employed such as Apple Macintosh OS, IBM OS/2, Microsoft DOS, Microsoft Windows 2000/2003/3.1/95/98/ CE/Millennium/NT/Vista/XP (Server), Palm OS, and/or the like. The operating system may be one specifically optimized to be run on a mobile computing device, such as iOS, Android, Windows Phone, Tizen, Symbian, and/or the like. An operating system may communicate to and/or with other components in a component collection, including itself, and/or the like. Most frequently, the operating system communicates with other program components, user interfaces, and/or the like. For example, the operating system may contain, communicate, generate, obtain, and/or provide program component, system, user, and/or data communications, requests, and/or responses. The operating system, once executed by the CPU, may enable the interaction with communications networks, data, I/O, peripheral devices, program components, memory, user input devices, and/or the like. The operating system may provide communications protocols that allow the controller of the present invention to communicate with other entities through a communications network. Various communication protocols may be used by the controller of the present invention as a subcarrier transport mechanism for interaction, such as, but not limited to: multicast, TCP/IP, UDP, unicast, and/or the like.

Information Server

An information server component is a stored program component that is executed by a CPU. The information server may be a conventional Internet information server such as, but not limited to Apache Software Foundation's Apache, Microsoft's Internet Information Server, and/or the like. The information server may allow for the execution of program components through facilities such as Active Server Page (ASP), ActiveX, (ANSI) (Objective-) C (++), C# and/or .NET, Common Gateway Interface (CGI) scripts, dynamic (D) hypertext markup language (HTML), FLASH, Java, JavaScript, Practical Extraction Report Language (PERL), Hypertext Pre-Processor (PHP), pipes, Python, wireless application protocol (WAP), WebObjects, and/or the like. The information server may support secure communications protocols such as, but not limited to, File Transfer Protocol (FTP); HyperText Transfer Protocol (HTTP); Secure Hypertext Transfer Protocol (HTTPS), Secure Socket Layer (SSL), messaging protocols (e.g., America Online (AOL) Instant Messenger (AIM), Application Exchange (APEX), ICQ, Internet Relay Chat (IRC), Microsoft Network (MSN) Messenger Service, Presence and Instant Messaging Protocol (PRIM), Internet Engineering Task Force's (IETF's) Session Initiation Protocol (SIP), SIP for Instant Messaging and Presence Leveraging Extensions (SIMPLE), open XML-based Extensible Messaging and Presence Protocol (XMPP) (i.e., Jabber or Open Mobile Alliance's (OMA's) Instant Messaging and Presence Service (IMPS)), Yahoo! Instant Messenger Service, and/or the like. The information server provides results in the form of Web pages to Web browsers, and allows for the manipulated generation of the Web pages through interaction with other program components. After a Domain Name System (DNS) resolution portion of an HTTP request is resolved to a particular information server, the information server resolves requests for information at specified locations on the controller of the present invention based on the remainder of the HTTP request. For example, a request such as http://123.124.125.126/myInformation.html might have the IP portion of the request "123.124.125.126" resolved by a DNS server to an information server at that IP address; that information server might in turn further parse the http request for the "/myInformation.html" portion of the request and resolve it to a location in memory containing the information "myInformation.html." Additionally, other information serving protocols may be employed across various ports, e.g., FTP communications across port, and/or the like. An information server may communicate to and/or with other components in a component collection, including itself, and/or facilities of the like. Most frequently, the information server communicates with the database of the present invention, operating systems, other program components, user interfaces, Web browsers, and/or the like.

Access to the database of the present invention may be achieved through a number of database bridge mechanisms such as through scripting languages as enumerated below (e.g., CGI) and through inter-application communication channels as enumerated below (e.g., CORBA, WebObjects, etc.). Any data requests through a Web browser are parsed through the bridge mechanism into appropriate grammars as required by the present invention. In one embodiment, the information server would provide a Web form accessible by a Web browser. Entries made into supplied fields in the Web form are tagged as having been entered into the particular fields, and parsed as such. The entered terms are then passed along with the field tags, which act to instruct the parser to generate queries directed to appropriate tables and/or fields. In one embodiment, the parser may generate queries in standard SQL by instantiating a search string with the proper join/select commands based on the tagged text entries, wherein the resulting command is provided over the bridge mechanism to the present invention as a query. Upon generating query results from the query, the results are passed over the bridge mechanism, and may be parsed for formatting and generation of a new results Web page by the bridge mechanism. Such a new results Web page is then provided to the information server, which may supply it to the requesting Web browser.

Also, an information server may contain, communicate, generate, obtain, and/or provide program component, system, user, and/or data communications, requests, and/or responses.

User Interface

Computer interfaces in some respects are similar to automobile operation interfaces. Automobile operation interface elements such as steering wheels, gearshifts, and speedometers facilitate the access, operation, and display of automobile resources, and status. Computer interaction interface elements such as check boxes, cursors, menus, scrollers, and windows (collectively and commonly referred to as widgets) similarly facilitate the access, capabilities, operation, and display of data and computer hardware and operating system resources, and status. Operation interfaces are commonly called user interfaces. Graphical user interfaces (GUIs) such as the Apple Macintosh Operating System's Aqua, IBM's OS/2, Microsoft's Windows 2000/2003/3.1/95/98/CE/Millennium/NT/XP/Vista/7 (i.e., Aero), Unix's X-Windows (e.g., which may include additional Unix graphic interface libraries and layers such as K Desktop Environment (KDE), mythTV and GNU Network Object Model Environment (GNOME)), web interface libraries (e.g., ActiveX, AJAX, (D)HTML, FLASH, Java, JavaScript, etc. interface libraries such as, but not limited to, Dojo, jQuery(UI), MooTools, Prototype, script.aculo.us, SWFObject, Yahoo! User Interface, any of which may be used and) provide a baseline and means of accessing and displaying information graphically to users.

A user interface component is a stored program component that is executed by a CPU. The user interface may be a conventional graphic user interface as provided by, with, and/or atop operating systems and/or operating environments such as already discussed. The user interface may allow for the display, execution, interaction, manipulation, and/or operation of program components and/or system facilities through textual and/or graphical facilities. The user interface provides a facility through which users may affect, interact, and/or operate a computer system. A user interface may communicate to and/or with other components in a component collection, including itself, and/or facilities of the like. Most frequently, the user interface communicates with operating systems, other program components, and/or the like. The user interface may contain, communicate, generate, obtain, and/or provide program component, system, user, and/or data communications, requests, and/or responses.

Web Browser

A Web browser component is a stored program component that is executed by a CPU. The Web browser may be a conventional hypertext viewing application such as Microsoft Internet Explorer or Netscape Navigator. Secure Web browsing may be supplied with 128 bit (or greater) encryption by way of HTTPS, SSL, and/or the like. Web browsers allowing for the execution of program components through facilities such as ActiveX, AJAX, (D)HTML, FLASH, Java, JavaScript, web browser plug-in APIs (e.g., FireFox, Safari Plug-in, and/or the like APIs), and/or the like. Web browsers and like information access tools may be integrated into PDAs, cellular telephones, and/or other mobile devices. A Web browser may communicate to and/or with other components in a component collection, including itself, and/or facilities of the like. Most frequently, the Web browser communicates with information servers, operating systems, integrated program components (e.g., plug-ins), and/or the like; e.g., it may contain, communicate, generate, obtain, and/or provide program component, system, user, and/or data communications, requests, and/or responses. Of course, in place of a Web browser and information server, a combined application may be developed to perform similar functions of both. The combined application would similarly affect the obtaining and the provision of information to users, user agents, and/or the like from the enabled nodes of the present invention. The combined application may be nugatory on systems employing standard Web browsers.

Mail Server

A mail server component is a stored program component that is executed by a CPU. The mail server may be a conventional Internet mail server such as, but not limited to sendmail, Microsoft Exchange, and/or the like. The mail server may allow for the execution of program components through facilities such as ASP, ActiveX, (ANSI) (Objective-) C (++), C# and/or .NET, CGI scripts, Java, JavaScript, PERL, PHP, pipes, Python, WebObjects, and/or the like. The mail server may support communications protocols such as, but not limited to: Internet message access protocol (IMAP), Messaging Application Programming Interface (MAPI)/Microsoft Exchange, post office protocol (POP3), simple mail transfer protocol (SMTP), and/or the like. The mail server can route, forward, and process incoming and outgoing mail messages that have been sent, relayed and/or otherwise traversing through and/or to the present invention.

Access to the mail of the present invention may be achieved through a number of APIs offered by the individual Web server components and/or the operating system.

Also, a mail server may contain, communicate, generate, obtain, and/or provide program component, system, user, and/or data communications, requests, information, and/or responses.

Mail Client

A mail client component is a stored program component that is executed by a CPU. The mail client may be a conventional mail viewing application such as Apple Mail, Microsoft Entourage, Microsoft Outlook, Microsoft Outlook Express, Mozilla, Thunderbird, and/or the like. Mail clients may support a number of transfer protocols, such as: IMAP, Microsoft Exchange, POP3, SMTP, and/or the like. A mail client may communicate to and/or with other components in a component collection, including itself, and/or facilities of the like. Most frequently, the mail client communicates with mail servers, operating systems, other mail clients, and/or the like; e.g., it may contain, communicate, generate, obtain, and/or provide program component, system, user, and/or data communications, requests, information, and/or responses. Generally, the mail client provides a facility to compose and transmit electronic mail messages.

Cryptographic Server

A cryptographic server component is a stored program component that is executed by a CPU, cryptographic processor, cryptographic processor interface, cryptographic processor device, and/or the like. Cryptographic processor interfaces will allow for expedition of encryption and/or decryption requests by the cryptographic component; however, the cryptographic component, alternatively, may run on a conventional CPU. The cryptographic component allows for the encryption and/or decryption of provided data. The cryptographic component allows for both symmetric and asymmetric (e.g., Pretty Good Protection (PGP)) encryption and/or decryption. The cryptographic component may employ cryptographic techniques such as, but not limited to: digital certificates (e.g., X.509 authentication framework), digital signatures, dual signatures, enveloping, password access protection, public key management, and/or the like. The cryptographic component will facilitate numerous (encryption and/or decryption) security protocols such as, but not limited to: checksum, Data Encryption Standard (DES), Elliptical Curve Encryption (ECC), International Data Encryption Algorithm (IDEA), Message Digest 5 (MD5, which is a one way hash function), passwords, Rivest Cipher (RC5), Rijndael, RSA (which is an Internet encryption and authentication system that uses an algorithm developed in 1977 by Ron Rivest, Adi Shamir, and Leonard Adleman), Secure Hash Algorithm (SHA), Secure Socket Layer (SSL), Secure Hypertext Transfer Protocol (HTTPS), and/or the like. Employing such encryption security protocols, the present invention may encrypt all incoming and/or outgoing communications and may serve as node within a virtual private network (VPN) with a wider communications network. The cryptographic component facilitates the process of "security authorization" whereby access to a resource is inhibited by a security protocol wherein the cryptographic component effects authorized access to the secured resource. In addition, the cryptographic component may provide unique identifiers of content, e.g., employing and MD5 hash to obtain a unique signature for an digital audio file. A cryptographic component may communicate to and/or with other components in a component collection, including itself, and/or facilities of the like. The cryptographic component supports encryption schemes allowing for the secure transmission of information across a communications network to enable the component of the present invention to engage in secure transactions if so desired. The cryptographic component facilitates the secure accessing of resources on the present invention and facilitates the access of secured resources on remote systems; i.e., it may act as a client and/or server of secured resources. Most frequently, the cryptographic component communicates with information servers, operating systems, other program components, and/or the like. The cryptographic component may contain, communicate, generate, obtain, and/or provide program component, system, user, and/or data communications, requests, and/or responses.

The Database of the Present Invention

The database component of the present invention may be embodied in a database and its stored data. The database is a stored program component, which is executed by the CPU; the stored program component portion configuring the CPU to process the stored data. The database may be a conventional, fault tolerant, relational, scalable, secure database such as Oracle or Sybase. Relational databases are an extension of a flat file. Relational databases consist of a series of related tables. The tables are interconnected via a key field. Use of the key field allows the combination of the tables by indexing against the key field; i.e., the key fields act as dimensional pivot points for combining information from various tables. Relationships generally identify links maintained between tables by matching primary keys. Primary keys represent fields that uniquely identify the rows of a table in a relational database. More precisely, they uniquely identify rows of a table on the "one" side of a one-to-many relationship.

Alternatively, the database of the present invention may be implemented using various standard data-structures, such as an array, hash, (linked) list, struct, structured text file (e.g., XML), table, and/or the like. Such data-structures may be stored in memory and/or in (structured) files. In another alternative, an object-oriented database may be used, such as Frontier, ObjectStore, Poet, Zope, and/or the like. Object databases can include a number of object collections that are grouped and/or linked together by common attributes; they may be related to other object collections by some common attributes. Object-oriented databases perform similarly to relational databases with the exception that objects are not just pieces of data but may have other types of functionality encapsulated within a given object. If the database of the present invention is implemented as a data-structure, the use of the database of the present invention may be integrated into another component such as the component of the present invention. Also, the database may be implemented as a mix of data structures, objects, and relational structures. Databases may be consolidated and/or distributed in countless variations through standard data processing techniques. Portions of databases, e.g., tables, may be exported and/or imported and thus decentralized and/or integrated.

In one embodiment, the database component includes several tables. A Users (e.g., operators and physicians) table may include fields such as, but not limited to: user_id, ssn, dob, first_name, last_name, age, state, address_firstline, address_secondline, zipcode, devices_list, contact_info, contact_type, alt_contact_info, alt_contact_type, and/or the like to refer to any type of enterable data or selections discussed herein. The Users table may support and/or track multiple entity accounts. A Clients table may include fields such as, but not limited to: user_id, client_id, client_ip, client_type, client_model, operating_system, os_version, app_installed_flag, and/or the like. An Apps table may include fields such as, but not limited to: app_ID, app_name, app_type, OS_compatibilities_list, version, timestamp, developer_ID, and/or the like. A beverages table including, for example, heat capacities and other useful parameters of different beverages, such as depending on size beverage_name, beverage_size, desired_coolingtemp, cooling_time, favorite_drinker, number_of_beverages, current_beverage_temperature, current_ambient_temperature, and/or the like. A Parameter table may include fields including the foregoing fields, or additional ones such as cool_start_time, cool_preset, cooling_rate, and/or the like. A Cool Routines table may include a plurality of cooling sequences may include fields such as, but not limited to: sequence_type, sequence_id, flow_rate, avg_water_temp, cooling_time, pump_setting, pump_speed, pump_pressure, power_level, temperature_sensor_id_number, temperature_sensor_location, and/or the like.

In one embodiment, user programs may contain various user interface primitives, which may serve to update the platform of the present invention. Also, various accounts may require custom database tables depending upon the environments and the types of clients the system of the present invention may need to serve. It should be noted that any unique fields may be designated as a key field throughout. In an alternative embodiment, these tables have been decentralized into their own databases and their respective database controllers (i.e., individual database controllers for each of the above tables). Employing standard data processing techniques, one may further distribute the databases over several computer systemizations and/or storage devices. Similarly, configurations of the decentralized database controllers may be varied by consolidating and/or distributing the various database components. The system of the present invention may be configured to keep track of various settings, inputs, and parameters via database controllers.

When introducing elements of the present disclosure or the embodiment(s) thereof, the articles "a," "an," and "the" are intended to mean that there are one or more of the elements. Similarly, the adjective "another," when used to introduce an element, is intended to mean one or more elements. The terms "including" and "having" are intended to be inclusive such that there may be additional elements other than the listed elements.

Although this invention has been described with a certain degree of particularity, it is to be understood that the present disclosure has been made only by way of illustration and that numerous changes in the details of construction and arrangement of parts may be resorted to without departing from the spirit and the scope of the invention.

What is claimed is:

1. A method for providing property management services, the method comprising:
   receiving, using a graphical user interface coupled to an electronic device, login credentials for a user for access to a digital application for providing property management services, wherein the electronic device is coupled to one or more secondary electronic devices through one or more servers;
   authenticating, using a processor coupled to the electronic device, an identity of the user, wherein the authenticating includes determining a user type for the user;
   determining that the user is authenticated as belonging to a home owner user type;
   granting access to the user to a digital menu of the digital application configured for the user type for the user; and
   displaying the digital menu to the user, using the graphical user interface,
      wherein the digital application is a customer support portal that enables the user to at least perform an action related to a service ticket and a payment,
      wherein the digital menu enables the user to apply for a parking decal and open one or more service tickets pertaining to one or more tasks to be completed, and
      wherein the digital application enables third parties to engage in commerce independently through the digital application.

2. The method as recited in claim 1, wherein the user type is selected from the group consisting of administrator; power user; the home owner; and vendor.

3. The method as recited in claim 2, wherein, if the user is authenticated as belonging to the administrator user type, the user is granted access to perform tasks selected from the group consisting of:
   editing an authentication table for use in authenticating the user;
   editing service tickets;
   deleting service tickets;
   creating announcements to be sent to one or more secondary users;
   editing the announcements;
   entering contact information;
   editing contact information;
   entering financial information;
   editing financial information;
   uploading documents;
   deleting documents;
   monitoring service tickets;
   sending out messages;
   sending online invites; and
   viewing reports.

4. The method as recited in claim 2, wherein, if the user is authenticated as belonging to the power use user type, the user is granted access to perform tasks selected from the group consisting of:
   creating announcements to be sent to one or more secondary users;
   editing the announcements;
   entering contact information;
   editing contact information;
   entering financial information;
   editing financial information;
   uploading documents;
   deleting documents;
   monitoring service tickets;
   sending out messages;
   sending online invites; and
   viewing reports.

5. The method as recited in claim 2, wherein, if the user is authenticated as belonging to the home owner user type, the user is granted access to perform tasks selected from the group consisting of:
   reading one or more announcements;
   reading financial information;
   downloading documents; and
   performing payment functions.

6. The method as recited in claim 2, wherein, if the user is authenticated as belonging to the vendor user type, the user is granted access to perform tasks selected from the group consisting of:

reading one or more service tickets pertaining to one or more tasks to be completed; and changing a status of at least one of the one or more service tickets.

7. The method as recited in claim 1, further comprising customizing the digital menu for each user type.

8. The method as recited in claim 7, wherein the customizing further includes altering one or more functions of the digital application using a low-code development platform.

9. The method as recited in claim 1, further comprising enabling communication between two or more users using the digital application.

10. A system for providing property management services, the system comprising:

a memory configured to store a digital application for providing property management services;

a graphical user interface, coupled to an electronic device, configured to receive login credentials for a user for access to the digital application for providing property management services, wherein the electronic device is coupled to one or more secondary electronic devices through one or more servers; and a processor configured to:
authenticate an identity of the user;
determine a user type for the user;
determine that the user is authenticated as belonging to a home owner user type;
grant access to the user to a digital menu configured for the user type for the user,
wherein the graphical user interface is further configured to display the digital menu to the user, using the graphical user interface,
wherein the digital application is a customer support portal that enables the user to at least perform an action related to a service ticket and a payment,
wherein the digital menu enables the user to apply fora parking decal and open one or more service tickets pertaining to one or more tasks to be completed, and
wherein the digital application enables third parties to engage in commerce independently through the digital application.

11. The system as recited in claim 10, wherein the user type is selected from the group consisting of administrator; power user; the home owner; and vendor.

12. The system as recited in claim 11, wherein, if the user is authenticated as belonging to the administrator user type, the user is granted access to perform tasks selected from the group consisting of:

editing an authentication table for use in authenticating the user;
editing service tickets;
deleting service tickets;
creating announcements to be sent to one or more secondary users;
editing the announcements;
entering contact information;
editing contact information;
entering financial information;
editing financial information;
uploading documents;
deleting documents;
monitoring service tickets;
sending out messages;
sending online invites; and
viewing reports.

13. The system as recited in claim 11, wherein, if the user is authenticated as belonging to the power use user type, the user is granted access to perform tasks selected from the group consisting of:

creating announcements to be sent to one or more secondary users;
editing the announcements;
entering contact information;
editing contact information;
entering financial information;
editing financial information;
uploading documents;
deleting documents;
monitoring service tickets;
sending out messages;
sending online invites; and
viewing reports.

14. The system as recited in claim 11, wherein, if the user is authenticated as belonging to the home owner user type, the user is granted access to perform tasks selected from the group consisting of:

reading one or more announcements;
reading financial information;
downloading documents; and
performing payment functions.

15. The system as recited in claim 11, wherein, if the user is authenticated as belonging to the vendor user type, the user is granted access to perform tasks selected from the group consisting of:

reading one or more service tickets pertaining to one or more tasks to be completed; and
changing a status of at least one of the one or more service tickets.

16. The system as recited in claim 10, wherein the digital application is configured to enable customization of the digital menu for each user type.

17. The system as recited in claim 16, wherein the digital application is configured to enable customization of the digital menu such that one or more functions of the digital application can be altered using a low-code development platform.

18. The system as recited in claim 10, wherein the server is configured to enable communication between two or more users using the digital application.

* * * * *